United States Patent
Kulkarni et al.

(10) Patent No.: US 10,380,087 B2
(45) Date of Patent: Aug. 13, 2019

(54) FILE LOCKING FRAMEWORK

(71) Applicant: BANK OF AMERICA CORPORATION, Charlotte, NC (US)

(72) Inventors: Atul Kulkarni, Telengana (IN); Malapaka V. L. N. Jogeswara Sarma, Telangana (IN); Timmy L. Gauvin, Peachtree City, GA (US)

(73) Assignee: Bank of America Corporation, Charlotte, NC (US)

( * ) Notice: Subject to any disclaimer, the term of this patent is extended or adjusted under 35 U.S.C. 154(b) by 762 days.

(21) Appl. No.: 14/588,742

(22) Filed: Jan. 2, 2015

(65) Prior Publication Data

US 2016/0196537 A1 Jul. 7, 2016

(51) Int. Cl.
*G06Q 20/42* (2012.01)
*G06F 16/22* (2019.01)
*G06F 16/51* (2019.01)
*G06F 16/176* (2019.01)
*G06Q 20/04* (2012.01)
*G06Q 20/10* (2012.01)
*G06Q 20/32* (2012.01)
*G06Q 20/38* (2012.01)

(52) U.S. Cl.
CPC ...... *G06F 16/2228* (2019.01); *G06F 16/1774* (2019.01); *G06F 16/51* (2019.01); *G06Q 20/042* (2013.01); *G06Q 20/108* (2013.01); *G06Q 20/3223* (2013.01); *G06Q 20/389* (2013.01); *G06Q 20/42* (2013.01)

(58) Field of Classification Search
CPC .................................................. G06Q 20/0425
USPC .......................................................... 705/45
See application file for complete search history.

(56) References Cited

U.S. PATENT DOCUMENTS

| | | | |
|---|---|---|---|
| 2008/0062168 A1* | 3/2008 | Poullier | H04N 1/00132 345/419 |
| 2009/0287731 A1* | 11/2009 | Motoyama | G06Q 10/06 |
| 2011/0320358 A1* | 12/2011 | Harris | G06Q 40/00 705/45 |

FOREIGN PATENT DOCUMENTS

WO    WO2001037097 A1 *   5/2001

\* cited by examiner

*Primary Examiner* — Cho Kwong
(74) *Attorney, Agent, or Firm* — Michael A. Springs; Moore & Van Allen PLLC; Anup Shrinivasan Iyer

(57) ABSTRACT

The present invention is directed to a system that ensures one-by-one processing of incoming check image files. The system receives incoming check image files and inputs them into a queue for processing. An application server (e.g., a thread) then selects one check image file from the queue for processing. For example, the system may process the check image to extract check information from the check image file. Once selected by the application server, the check image file is "locked" so that no other thread is enabled to select the same check image file. In this way, the system of the present invention is configured to ensure that each check image file is processed only one time.

13 Claims, 4 Drawing Sheets

200

| FILE NAME | SIZE | TYPE | MODIFIED | ATTRIBUTES |
|---|---|---|---|---|
| FILE1.READY.DONE | XXXX | DONE FILE | XX/XX/XXXX XX:XX:XX | -rw-r--r-- |
| FILE2.READY.DONE | XXXXX | DONE FILE | XX/XX/XXXX XX:XX:XX | -rw-r--r-- |
| FILE3.READY.DONE | XXXX | DONE FILE | XX/XX/XXXX XX:XX:XX | -rw-r--r-- |
| FILE4.READY.LCK | XXXXXX | LCK FILE | XX/XX/XXXX XX:XX:XX | -rw-r--w-- |
| FILE5.READY.LCK | XXXXX | LCK FILE | XX/XX/XXXX XX:XX:XX | -rw-r--w-- |
| FILE6.READY.LCK | XXXXX | LCK FILE | XX/XX/XXXX XX:XX:XX | -rw-r--w-- |
| FILE7.READY | XXXX | READY FILE | XX/XX/XXXX XX:XX:XX | -rw-w--w-- |
| FILE8.READY | XXXXXXX | READY FILE | XX/XX/XXXX XX:XX:XX | -rw-w--w-- |
| FILE9.READY | XXXXX | READY FILE | XX/XX/XXXX XX:XX:XX | -rw-w--w-- |

| FILE NAME | THREAD | SOURCE LOCATION | FILE RECEIVED TIME | FILE LOCKED TIMESTAMP |
|---|---|---|---|---|
| FILE1.READY | XX | XXXX | XX/XX/XXXX XX:XX:XX | N/A |
| FILE2.READY.LCK | XX | XXXX | XX/XX/XXXX XX:XX:XX | XX/XX/XXXX XX:XX:XX |
| FILE3.READY.LCK | XX | XXXX | XX/XX/XXXX XX:XX:XX | XX/XX/XXXX XX:XX:XX |

FIGURE 3

FILE LOCKING FRAMEWORK

BACKGROUND

An image of a check that is captured during a transaction, such as a deposit or a payment, is typically processed by a financial to extract check information (e.g., payment information, account information, or the like) from the check image. This extracted check information is then used to execute and/or complete the transaction.

While financial institutions currently utilize systems that process check image files, these systems experience shortcomings due to often-high quantities of check image files to be processed. For example, a system may process one check image file multiple times, thereby resulting in not only a duplication of work performed by the system, but also a duplication of check information records. What is more, a considerable amount of time and resources is spent reconciling discrepancies in processed check images and check information records. Therefore, there is a need for a system that ensures a one-time-only processing of each check image file.

BRIEF SUMMARY

The present invention is directed to a system that ensures one-by-one processing of incoming check image files. The system receives incoming check image files and inputs them into a queue for processing. An application server then selects a check image file from the queue for processing (e.g., to extract check information from the check image file). Once selected by the application server, the check image file is "locked" so that no other application server can select the same check image file. In this way, the system of the present invention is configured to ensure that each check image file is processed only one time.

The system of the present invention provides many benefits. First, the system of the present invention eliminates duplicate processing of incoming check image files. This streamlines the check image file processing processes and drastically reduces the amount of time and resources required to process check image files. Further, accuracy of check images, check information, and/or transaction information is greatly increased. Moreover, the system of the present invention reduces the amount of time required to correct any discrepancies in duplicate check image and/or check information records. Clearly, the system of the present invention saves financial institutions a considerable amount of time and resources when processing check image files.

In some embodiments, a system for processing check image files is provided. The system comprises: at least one memory; at least one processor; and at least one module stored in memory, executable by the at least one processor, and configured for: receiving one or more check image files; selecting, using a thread, one of the one or more received check image files for processing; determining that the one selected check image file has not been processed; locking the one selected check image file by renaming a file name of the one selected check image file, thereby preventing the one selected check image file from being selected more than once or by another thread; and processing the one selected check image file, thereby extracting information from the check image file.

In some embodiments, the module further comprises instruction code configured to cause said processor to store the one or more received check image files in a datastore upon receipt of the one or more check image files.

In some embodiments, the module further comprises instruction code configured to cause said processor to rename, upon receipt of the one or more check image files, a file name of each of the one or more received check image files to thereby indicate that the one or more received check image files are ready for selection.

In some embodiments, the module further comprises instruction code configured to cause said processor to generate a queue of check image files, the queue comprising the one or more received check image files, and wherein the one selected check image file is selected from the queue.

In some embodiments, the module further comprises instruction code configured to cause said processor to assign a randomly-generated key to each of the one or more received check image files.

In some embodiments, determining that the one selected check image file has not been processed comprises: comparing the randomly-generated key of the one selected check image file to one or more unique keys of check image files that are known to have already been selected or processed; and determining no match between the randomly-generated key of the one selected check image file and one or more unique keys of check image files that are known to have already been selected or processed.

In some embodiments, the module is further configured for inserting a row into a log table upon locking of the one selected check image file, the row comprising the one selected check image file.

In some embodiments, the module further comprises instruction code configured to cause said processor to transmit information extracted from the check image file to a second apparatus for execution of a transaction.

In some embodiments, the extracted information comprises at least one of contact information, account information, transaction information, and check information.

In some embodiments, the module further comprises instruction code configured to cause said processor to rename, upon processing of the one selected check image file, the file name of the check image file to thereby indicate that the one selected check image file has been processed.

In some embodiments, the module further comprises instruction code configured to cause said processor to delete a row in a log table upon processing of the selected check image file, the row comprising the selected check image file.

In some embodiments, the module further comprises instruction code configured to cause said processor to assign the randomly-generated key of the one selected check image to the thread.

In some embodiments, a method for processing check image files is provided. The method comprises: receiving, by a computing device processor, one or more check image files; selecting, using a thread and by a computing device processor, one of the one or more received check image files for processing; determining, by a computing device processor, that the one selected check image file has not been processed; locking the one selected check image file by renaming a file name of the one selected check image file, thereby preventing the one selected check image file from being selected more than once or by another thread; and processing, by a computing device processor, the one selected check image file, thereby extracting information from the check image file.

In some embodiments, a computer program product for processing check image files is provided. The computer program product comprises a non-transitory computer-readable medium comprising code causing an apparatus to: receive one or more check image files; select, using a thread, one of the one or more received check image files for processing; determine that the one selected check image file has not been processed; lock the one selected check image file by renaming a file name of the one selected check image file, thereby preventing the one selected check image file from being selected more than once or by another thread; and process the one selected check image file, thereby extracting information from the check image file.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
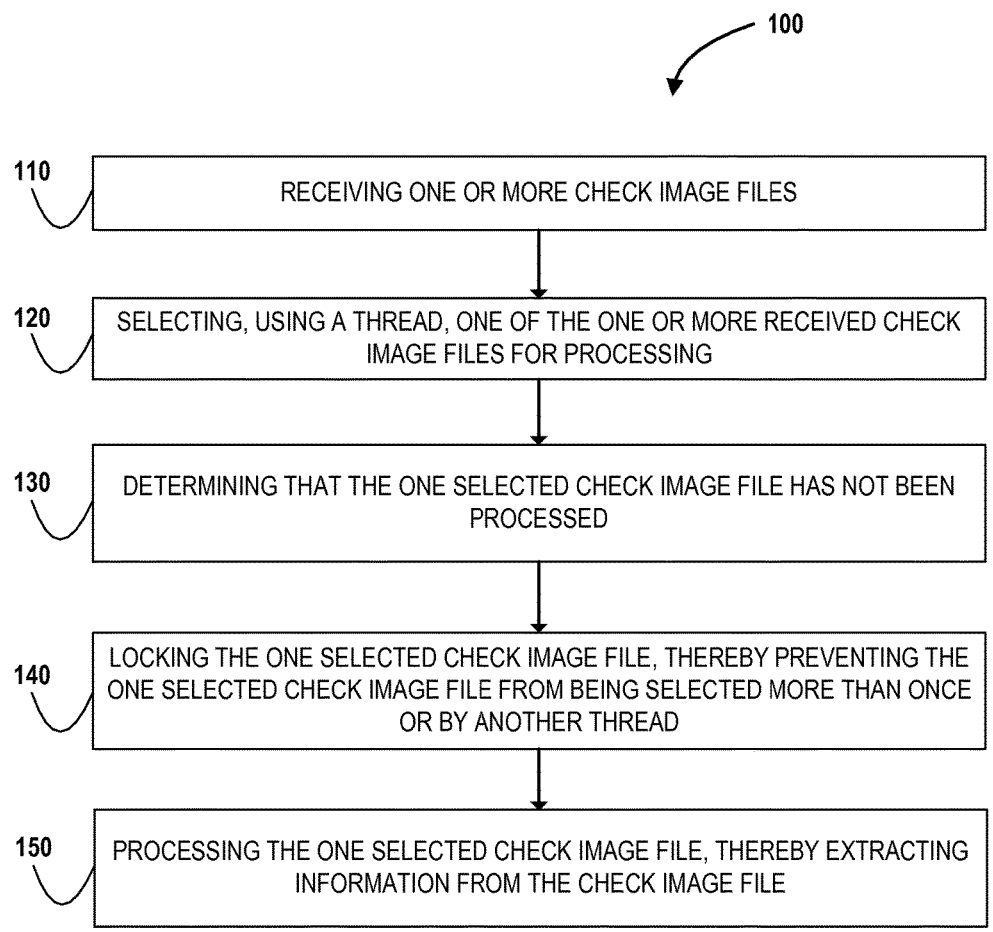
Figure 4:
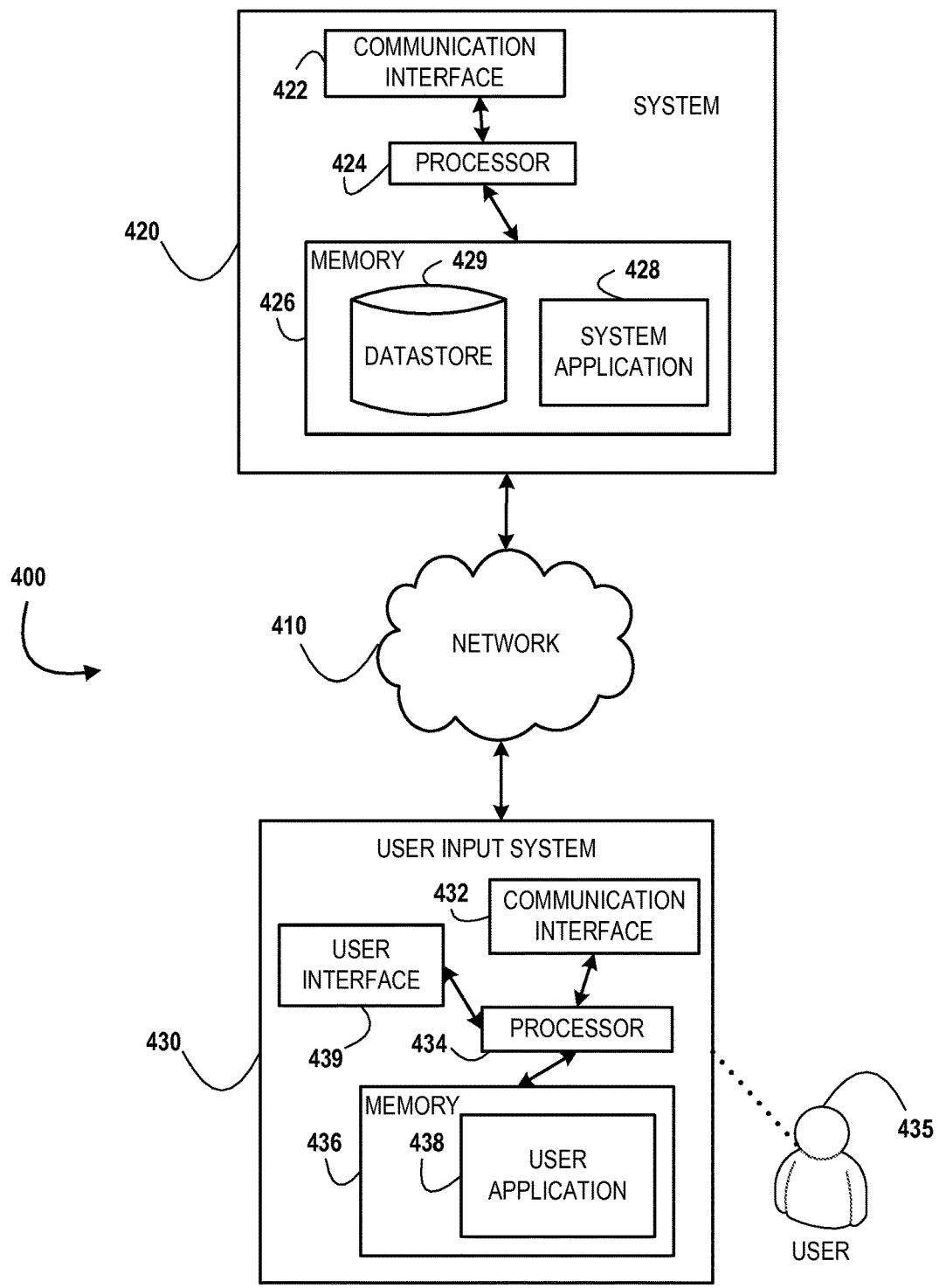

Having thus described embodiments of the invention in general terms, reference will now be made to the accompanying drawings, where:

FIG. 1 is an exemplary process flow illustrating a process for processing check image files, in accordance with embodiments of the present invention;

FIG. 2 is an exemplary user interface for a check image file queue, in accordance with embodiments of the present invention;

FIG. 3 is an exemplary user interface for a log table, in accordance with embodiments of the present invention; and FIG. 4 is an exemplary system environment for a repository validation system, in accordance with embodiments of the present invention.

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may a non-financial institution such as a third party data processing firm.

As used herein, the term "user" refers to anyone who interacts with the present invention. Typically, the user is an associate (e.g., an employee, agent, contractor, or the like) of a financial institution (e.g., the entity) who is responsible for processing check image files. The user may also be a data processing specialist, a researcher, an information technology specialist, a teller, or another type of associate.

As used herein, the term "check image file" refers to any type of file. For example, a check image file may include an image, text, a video, audio, any other data type, or a combination of the aforementioned data types. In this way, the check image file may exist in a variety of formats with different file extensions. Additionally, the check image file may not refer to an image of a check, but rather to an image of a receipt, an account summary, and/or a deposit slip, an electronic receipt, or the like. Typically, the check image is some sort of image of a financially-related document or statement, but this is not required. As such, the present invention may be applied to processing of files in general and not only of a specific, financially-focused application.

The present invention is directed to a system that ensures one-by-one processing of incoming check image files. The system receives incoming check image files and inputs them into a queue for processing. An application server then selects a check image file from the queue for processing (e.g., to extract check information from the check image file). Once selected by the application server, the check image file is "locked" so that no other application server can select the same check image file. In this way, the system of the present invention is configured to ensure that each check image file is processed only one time.

The system of the present invention provides many benefits. First, the system of the present invention eliminates duplicate processing of incoming check image files. This streamlines the check image file processing processes and drastically reduces the amount of time and resources required to process check image files. Further, accuracy of check images, check information, and/or transaction information is greatly increased. Moreover, the system of the present invention reduces the amount of time required to correct any discrepancies in duplicate check image and/or check information records. Clearly, the system of the present invention saves financial institutions a considerable amount of time and resources when processing check image files.

The system of the present invention is configured to receive one or more check image files. Check image files may be received by the system of the present invention from a plurality of sources. For example, the system of the present invention may receive check image files from the entity, an automated teller machine (ATM), another financial institution, a third party payment processing entity, a user or a user's mobile device, and/or the like. The system of the present invention may also receive check image files from multiple servers that receive, store, and/or process check images.

When the system of the present invention receives one or more check image files, the system of the present invention may rename each of the check image files. For example, the system of the present invention may append each newly-received check image file with a ".READY" file extension suffix. In some embodiments, the renaming of each of the check image files converts each check image file from a first format to a common format so that all received check image files are uniformly formatted and compatible with the system of the present invention.

Also upon receipt of check image files, the system of the present invention is configured to generate and assign a unique key to each received check image file. In some embodiments, the unique key is a randomly-generated number sequence that is assigned to each check image file for identification purposes. In this way, the system of the present invention may more easily track each check image file's status, location, and/or the like. Alternatively, the unique key may be an alphanumeric string of characters, a symbol, an icon, and/or another identifier.

The system of the present invention may be configured to store the received check image files for later recall. The received check image files may be stored in multiple storage locations. In another embodiment, the received check image files may be stored in one storage location. In this way, the system of the present invention consolidates received check image files to one central storage location. The storing of each check image file may occur prior to or after renaming each check image file and/or assigning a unique key to each check image file.

Next, the system of the present invention is configured to generate a queue of check image files to be processed as seen in FIG. 2. Each received check image file is placed (e.g., inputted) into the queue by the system of the invention. Typically, the check image files are placed into the queue based on when they were received by the system of the present invention.

The system of the present invention is configured to then retrieve (e.g., select) one check image file from the queue at a time. The system of the present invention may include one or more threads (e.g., application servers) that are configured to monitor the queue for check image files that are ready for processing (e.g., check image files that have been renamed with the ".READY" file extension suffix). By utilizing a plurality of threads, the system of the present invention is able to retrieve and/or process the received check image files more efficiently. Therefore, each thread is configured to retrieve a check image file from the queue in a one-at-a-time fashion.

Upon retrieval of a check image file from the queue by a thread, the system of the present invention is configured to determine if the retrieved check image file has already been retrieved and/or processed by another thread of the system of the present invention (or another system or apparatus). As such, the system of the present invention compares the unique key of the retrieved check image file to one or more unique keys in a database that are known to have already been retrieved and/or processed. In this way, the system of the present invention ensures that each check image file is retrieved and/or processed only one time.

If the system of the present invention determines a match between the unique key of the retrieved check image file and a unique key in the database of one or more unique keys of check image files known to have already been retrieved and/or processed by another thread (e.g., application server, apparatus, system, or the like) based on a comparison of unique keys, the thread will release and not process the retrieved check image file, and then retrieve another check image file from the queue and repeats the aforementioned unique key comparison process. If the system of the present invention determines there is no match between unique keys, then the system of the present invention assigns (e.g., associates) the unique key of the retrieved check image file to the thread that the retrieved the check image file. This assignment of the unique key to the thread enables the system of the present invention (as well as any users of the system) to easily track which threads have retrieved and/or processed which check image files. In this way, the assignment of the unique key of the retrieved check image file to the thread serves as a handshake (e.g., confirmation) of successful retrieval of the check image file by the thread.

After assignment of the unique key of the retrieved check image file to the thread, the system of the present invention is configured to rename the retrieved check image file. For example, the system of the present invention may append the file name of the retrieved check image file to include an ".LCK" file extension suffix. Renaming the check image file in this way communicates to the system of the present invention (and other threads) that the retrieved check image file is now locked. The renamed check image file may be updated in the queue and, as such, no other thread is configured to retrieve the retrieved check image file. Therefore, locking the check image file by renaming the check image file name ensures that each check image file is retrieved and/or processed only one time.

Once the check image file name has been renamed to include the ".LCK" file extension suffix (thereby locking the check image file from being retrieved by another thread), the system of the present invention is configured to insert a row into a log table. The log table, as seen in FIG. 3, typically includes a summary of all check image files that are currently locked by the system of the present invention. More specifically, the log table provides a summary of all check image files that have been retrieved by a thread and may no longer be retrieved by any other thread. Therefore a user may review the log table to understand which check image files have been retrieved, and by which thread, to ensure that each check image file is retrieved and/or processed only one time.

The inserted row includes information associated with the retrieved check image file (which is now locked based on its renaming). The row may be inserted prior to or after the assignment of the unique key of the retrieved check image file to the thread that retrieved the check image file.

Next, the system of the present invention is configured to process the check image file. For example, the system of the present invention may extract information from the check image file. Extracted information may include contact information (e.g., a customer name, a customer address, a customer phone number, a customer email address, a merchant name, a merchant address, a merchant phone number, a merchant email address, and/or the like), account information (e.g., a routing number, an account number, financial institution information, and/or the like), transaction information (e.g., a transaction amount, a transaction date, a payee, a payment recipient, a payment type, a payment category, and/or the like), check information (e.g., a check number, an issuing financial institution, a memo, a check amount, a check date, and/or the like), or other types of information. Information may be extracted from the check image file by a variety of check image processing techniques such as image recognition and analysis, scanning, and/or the like.

In some embodiments, information is extracted from the check image file to execute a pending transaction. The extracted information may be transmitted to another apparatus or system for execution of the pending transaction. For example, extracted information may be transmitted to a merchant to execute a payment transaction at a point-of-sale (POS) terminal at a merchant location. Alternatively, the system of the present invention may validate or verify that information extracted from the check image file indeed matches the check image or other information associated with a transaction (e.g., a payment, a purchase, a deposit, and/or the like). The information extracted from the check image file may be stored and/or transmitted to another apparatus or system for future processing and recall.

After processing of the check image file by the system of the present invention is complete, the system of the present invention may again rename the check image file name. For example, the system of the present invention may append the file name of the retrieved check image file to include a ".DONE" file extension suffix. Renaming the check image file in this way communicates to the system of the present invention (and other threads) that processing of the retrieved check image file is now completed. The renamed check image file may be updated in the queue and, still, no other thread is configured to retrieve the retrieved check image file.

Further, upon renaming the check image file name to include the ".DONE" file extension suffix, the system of the present invention is configured to delete (e.g., remove) the inserted row in the log table. This indicates to the system of the present invention that the check image file is no longer being processed by the thread, and therefore should be removed from the log table.

Lastly, the system of the present invention may be integrated with a financial data system that stores large volumes of account information, contact information, transaction information, storage information, or the like associated with the entity. In this way, the system of the present invention is configured to receive, store, and transmit information between various devices and storage (e.g., memory) locations and/or other apparatuses and systems.

Referring now to the figures, FIG. 1 is an exemplary process flow 100 for processing a check image file. At block 110, the process includes receiving one or more check image files. At block 120, the process includes selecting, using a thread, one of the one or more received check image files for processing. At block 130, the process includes determining that the one selected check image file has not been processed. At block 140, the process includes locking the one selected check image file by renaming a file name of the one selected check image file, thereby preventing the one selected check image file from being selected more than once or by another thread. At block 150, the process includes processing the one selected check image file, thereby extracting information from the check image file FIG. 2 is an exemplary user interface 200 for a check image file queue. The check image file queue typically includes a file name 202, a file size 204, a file type 206, a date and time of a most-recent modification 208, and file attributes 210 for each check image file received by the system of the present invention. As disclosed herein, the system of the present invention may rename the check image file names 202 according to its status during processing (e.g., ".READY," ".LCK," and ".DONE"), which also updates the file type 206 of each check image file. The modification 208 time and date is typically an indication of when each check image file was renamed, when its type changed, when information was extracted during processing, or the like. The attributes 210 may indicate which type of capabilities each check image file possesses. For example, a check image file may have read-only access, write-only access, or read-write access. The user typically reviews the queue by viewing interface 200 as threads select and/or retrieve check image files form the queue to ensure that each check image file is retrieved by only one thread.

FIG. 3 is an exemplary user interface 300 for a log table. As discussed above, the log table is utilized by the user to track check image files that have been retrieved from the queue by one or more threads. In this way, each check image file presented in the log table typically is ready to be locked, or has been locked already. The log table includes a file name 302, a thread 304, a source location 306, a file received time 308, and a file locked timestamp 310. The thread 304 indicates which thread has retrieved and/or is processing each check image file. The source location 306 indicates a storage or memory location from which each check image file was received. For example, the source location 306 may include a server name, an application name, an IP address, or another type of indicator of a storage location. The file received time 308 indicates the time at which each check image file was received by the system of the present invention and/or the thread. For example, the file received time 308 may indicate the time at which a thread retrieved a check image file from the queue. The file locked timestamp 310 indicates the time at which each check image file was locked by the thread (e.g., when the check image file is renamed with an ".LCK" file extension suffix).

FIG. 4 is an exemplary block diagram illustrating technical components of a system 400 for implementing the system of the present invention for researching and resolving an error case as described in process flow 100 of FIG. 1, as well as the exemplary interfaces 200 and 300 as illustrated in FIGS. 2 and 3. As illustrated, the system environment 400 includes a network 410, a system 420, and a user input system 430.

As shown in FIG. 4, the system 420, and the user input system 430 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 is secure and may also include wireless and/or wireline and/or optical interconnection technology.

FIG. 4 also illustrates a system 420, in accordance with an embodiment of the present invention. The system 420 may refer to the "system of the present invention" described herein. The system 420 may include any computerized apparatus that can be configured to perform any one or more of the functions of the system 420 described and/or contemplated herein. In accordance with some embodiments, for example, the system 420 may include a computer network, an engine, a platform, a server, a database system, a front end system, a back end system, a personal computer system, and/or the like. Therefore, the system 420 may be a server managed by the entity. The system 420 may be located at the facility associated with the entity or remotely from the facility associated with the entity. In some embodiments, such as the one illustrated in FIG. 4, the system 420 includes a communication interface 422, a processor 424, and a memory 426, which includes a system application 428 and a datastore 429 stored therein. As shown, the communication interface 422 is operatively and selectively connected to the processor 424, which is operatively and selectively connected to the memory 426.

It will be understood that the system application 428 may be configured to implement any one or more portions of the various user interfaces and/or process flow described herein. The system application 428 may interact with the user application 438. It will also be understood that, in some embodiments, the memory includes other applications. It will also be understood that, in some embodiments, the system application 428 is configured to communicate with the datastore 429, the user input system 430, or the like.

It will be further understood that, in some embodiments, the system application 428 includes computer-executable program code portions for instructing the processor 424 to perform any one or more of the functions of the system application 428 described and/or contemplated herein. In some embodiments, the system application 428 may include and/or use one or more network and/or system communication protocols.

In addition to the system application 428, the memory 426 also includes the datastore 429. As used herein, the datastore 429 may be one or more distinct and/or remote datastores. In some embodiments, the datastore 429 is not located within the system and is instead located remotely from the system. In some embodiments, the datastore 429 stores information or data described herein.

It will be understood that the datastore 429 may include any one or more storage devices, including, but not limited to, datastores, databases, and/or any of the other storage devices typically associated with a computer system. It will also be understood that the datastore 429 may store information in any known way, such as, for example, by using one or more computer codes and/or languages, alphanumeric character strings, data sets, figures, tables, charts, links, documents, and/or the like. Further, in some embodiments, the datastore 429 may include information associated with one or more applications, such as, for example, the system application 428. It will also be understood that, in some embodiments, the datastore 429 provides a substantially real-time representation of the information stored therein, so that, for example, when the processor 424 accesses the datastore 429, the information stored therein is current or substantially current.

It will be understood that the embodiment of the system environment illustrated in FIG. 4 is exemplary and that other embodiments may vary. As another example, in some embodiments, the system 420 includes more, less, or different components. As another example, in some embodiments, some or all of the portions of the system environment 400 may be combined into a single portion. Likewise, in some embodiments, some or all of the portions of the system 420 may be separated into two or more distinct portions.

In addition, the various portions of the system environment 400 may be maintained for and/or by the same or separate parties. It will also be understood that the system 420 may include and/or implement any embodiment of the present invention described and/or contemplated herein. For example, in some embodiments, the system 420 is configured to implement any one or more of the embodiments of the process flow 100 described and/or contemplated herein. Additionally, the system 420 or the user input system 430 is configured to initiate presentation of any of the user interfaces described herein.

The user input system 430 may include any computerized apparatus that can be configured to perform any one or more of the functions of the user input system 430 described and/or contemplated herein. For example, the user 435 may use the user input system 430 (e.g., a mobile device) to transmit and/or receive information or commands to and from the system 420. In some embodiments, for example, the user input system 430 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 4, in accordance with some embodiments of the present invention, the user input system 430 includes a communication interface 432, a processor 434, a memory 436 having a user application 438 stored therein, and a user interface 439. In such embodiments, the communication interface 432 is operatively and selectively connected to the processor 434, which is operatively and selectively connected to the user interface 439 and the memory 436. In some embodiments, the user 435 may use the user application 438 to execute processes described with respect to the process flow and interfaces described herein. Specifically, the user application 438 executes the process flow described in FIG. 1.

Each communication interface described herein, including the communication interface 432, generally includes hardware, and, in some instances, software, that enables the user input system 430, to transport, send, receive, and/or otherwise communicate information to and/or from the communication interface of one or more other systems on the network 410. For example, the communication interface 432 of the user input system 430 may include a wireless transceiver, modem, server, electrical connection, and/or other electronic device that operatively connects the user input system 430 to another system such as the system 420. The wireless transceiver may include a radio circuit to enable wireless transmission and reception of information. Each processor described herein, including the processor 434, generally includes circuitry for implementing the audio, visual, and/or logic functions of the user input system 430. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 438 of the memory 436 of the user input system 430.

Each memory device described herein, including the memory 436 for storing the user application 438 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 436 includes the user application 438. In some embodiments, the user application 438 includes an interface for communicating with, navigating, controlling, configuring, and/or using the user input system 430. In some embodiments, the user application 438 includes computer-executable program code portions for instructing the processor 434 to perform one or more of the functions of the user application 438 described and/or contemplated herein. In some embodiments, the user application 438 may include and/or use one or more network and/or system communication protocols.

Also shown in FIG. 4 is the user interface 439. In some embodiments, the user interface 439 includes one or more output devices, such as a display and/or speaker, for presenting information to the user 435. In some embodiments, the user interface 439 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 435. In some embodiments, the user interface 439 includes the input and display devices of a mobile device, which are operable to receive and display information.

Also shown in FIG. 4 is a user 435 of the user input system 430. The user input system 430 may be any computing device. The user 435 may be a person who uses the user input system 430 to execute a user application 438. The user application 438 may be an application to communicate with the system 420, perform a transaction, input information onto a user interface presented on the user input system 430, receive and/or transmit information, the like. The user application 438 and/or the system application 428 may incorporate one or more parts of any process flow described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for processing check image files, the system comprising:
   at least one memory;
   at least one processor; and
   at least one module stored in said memory and comprising instruction code that is executable by the at least one processor and configured to cause said at least one processor to:
   electronically retrieve one or more check image files stored in one or more databases;
   determine a unique key associated with each of the one or more check image files, wherein the unique key associated with each of the one or more check image files is used to track a status and location associated with each of the one or more check image files;
   store the one or more check image files with the unique key in a queue, wherein storing the one or more check image files in the queue further comprises indicating that the one or more check image files is available for processing based on at least a file extension associated with the one or more check image files;
   select, using one or more application servers, one of the one or more check image files for processing, wherein each of the one or more application servers is configured to retrieve the one or more check image files from the queue;
   compare the unique key of the one selected check image file to one or more unique keys of one or more check image files that are known to have already been selected for processing by one or more other application servers;
   determine no match between the unique key of the one selected check image file and the one or more unique keys of the one or more check image files that are known to have already been selected or processed, thereby determining that the one selected check image file has not been processed;
   determine that the one selected check image file is associated with a first format;
   transform the one selected check image file from the first format to a second format, thereby enabling the one selected check image file to be processed;
   lock the one selected check image file by renaming a file name of the one selected check image file, thereby preventing the one selected check image file from being selected more than once or by another application server;
   process the one selected check image file, wherein processing further comprises extracting information from the one selected check image file, wherein the extracted information comprises at least an account information, transaction information, and check information;
   electronically transmit the information extracted from the one selected check image file to a second apparatus;
   initiate an execution of a transaction using at least the information extracted from the one selected check image file at the second apparatus, wherein initiating the execution of the transaction further comprises comparing transaction information associated with the transaction with the extracted information to determine a match; and
   execute the transaction based on at least determining a match between the transaction information and the extracted information.

2. The system of claim 1, wherein the module further comprises instruction code configured to cause said processor to store the one or more received check image files in a datastore upon receipt of the one or more check image files.

3. The system of claim 1, wherein the module further comprises instruction code configured to cause said processor to rename, upon receipt of the one or more check image files, a file name of each of the one or more received check image files to thereby indicate that the one or more received check image files are ready for selection.

4. The system of claim 1, wherein the module further comprises instruction code configured to cause said processor to generate a queue of check image files, the queue comprising the one or more received check image files, and wherein the one selected check image file is selected from the queue.

5. The system of claim 1, wherein determining that the one selected check image file has already been processed comprises:
   comparing the unique key of the one selected check image file to one or more unique keys of check image files that are known to have already been selected or processed; and
   determining a match between the unique key of the one selected check image file and one or more unique keys of check image files that are known to have already been selected or processed.

6. The system of claim 1, wherein the module further comprises instruction code configured to cause said processor to insert a row into a log table upon locking of the one selected check image file, the row comprising the one selected check image file.

7. The system of claim 1, wherein the extracted information comprises at least one of contact information, account information, transaction information, and check information.

8. The system of claim 1, wherein the module further comprises instruction code configured to cause said processor to rename, upon processing of the one selected check image file, the file name of the check image file to thereby indicate that the one selected check image file has been processed.

9. The system of claim 1, wherein the module further comprises instruction code configured to cause said processor to delete a row in a log table upon processing of the selected check image file, the row comprising the selected check image file.

10. A method for processing check image files, the method comprising:
    electronically retrieving, using a computing device processor, one or more check image files stored in one or more databases;
    determining, using a computing device processor, a unique key associated with each of the one or more check image files, wherein the unique key associated with each of the one or more check image files is used to track a status and location associated with each of the one or more check image files;

storing, using a computing device processor, the one or more check image files with the unique key in a queue, wherein storing the one or more check image files in the queue further comprises indicating that the one or more check image files is available for processing based on at least a file extension associated with the one or more check image files selecting, using one or more application servers, one of the one or more check image files for processing, wherein each of the one or more application servers is configured to retrieve the one or more check image files from the queue;

comparing, using a computing device processor, the unique key of the one selected check image file to one or more unique keys of one or more check image files that are known to have already been selected for processing by one or more other application servers;

determining, using a computing device processor, no match between the unique key of the one selected check image file and the one or more unique keys of the one or more check image files that are known to have already been selected or processed, thereby determining that the one selected check image file has not been processed;

determining, using a computing device processor, that the one selected check image file is associated with a first format;

transforming, using a computing device processor, the one selected check image file from the first format to a second format, thereby enabling the one selected check image file to be processed;

locking, using a computing device processor, the one selected check image file by renaming a file name of the one selected check image file, thereby preventing the one selected check image file from being selected more than once or by another application server;

processing, using a computing device processor, the one selected check image file, wherein processing further comprises extracting information from the one selected check image file, wherein the extracted information comprises at least an account information, transaction information, and check information;

electronically transmitting, using a computing device processor, the information extracted from the one selected check image file to a second apparatus;

initiating, using a computing device processor, an execution of a transaction using at least the information extracted from the one selected check image file at the second apparatus, wherein initiating the execution of the transaction further comprises comparing transaction information associated with the transaction with the extracted information to determine a match; and executing, using a computing device processor, the transaction based on at least determining a match between the transaction information and the extracted information.

11. The method of claim 10, further comprising determining that the one selected check image file has already been processed, the determining comprising:

comparing the unique key of the one selected check image file to one or more unique keys of check image files that are known to have already been selected or processed; and determining a match between the unique key of the one selected check image file and one or more unique keys of check image files that are known to have already been selected or processed.

12. A computer program product for processing check image files, the computer program product comprising a non-transitory computer-readable medium comprising code causing an apparatus to:

electronically retrieve one or more check image files stored in one or more databases;

determine a unique key associated with each of the one or more check image files, wherein the unique key associated with each of the one or more check image files is used to track a status and location associated with each of the one or more check image files;

store the one or more check image files with the unique key in a queue, wherein storing the one or more check image files in the queue further comprises indicating that the one or more check image files is available for processing based on at least a file extension associated with the one or more check image files;

select, using one or more application servers, one of the one or more check image files for processing, wherein each of the one or more application servers is configured to retrieve the one or more check image files from the queue;

compare the unique key of the one selected check image file to one or more unique keys of one or more check image files that are known to have already been selected for processing by one or more other application servers;

determine no match between the unique key of the one selected check image file and the one or more unique keys of the one or more check image files that are known to have already been selected or processed, thereby determining that the one selected check image file has not been processed;

determine that the one selected check image file is associated with a first format;

transform the one selected check image file from the first format to a second format, thereby enabling the one selected check image file to be processed;

lock the one selected check image file by renaming a file name of the one selected check image file, thereby preventing the one selected check image file from being selected more than once or by another application server;

process the one selected check image file, wherein processing further comprises extracting information from the one selected check image file, wherein the extracted information comprises at least an account information, transaction information, and check information;

electronically transmit the information extracted from the one selected check image file to a second apparatus;

initiate an execution of a transaction using at least the information extracted from the one selected check image file at the second apparatus, wherein initiating the execution of the transaction further comprises comparing transaction information associated with the transaction with the extracted information to determine a match; and execute the transaction based on at least determining a match between the transaction information and the extracted information.

13. The computer program product of claim 12, wherein the non-transitory computer-readable medium comprises code further causing an apparatus to determine that the one selected check image file has already been processed, the determining comprising:
- comparing the unique key of the one selected check image file to one or more unique keys of check image files that are known to have already been selected or processed; and
- determining a match between the unique key of the one selected check image file and one or more unique keys of check image files that are known to have already been selected or processed.

* * * * *